Sept. 3, 1963           A. G. DEAN           3,102,498

SIDEWALL-TO-FLOOR CONNECTION FOR VEHICLES

Filed April 26, 1960

*INVENTOR.*
Albert G. Dean
BY
Wm. R. Glisson
*ATTORNEY*

United States Patent Office 3,102,498
Patented Sept. 3, 1963

3,102,498
SIDEWALL-TO-FLOOR CONNECTION
FOR VEHICLES
Albert G. Dean, Narberth, Pa., assignor to The Budd Company, Philadelphia, Pa., a corporation of Pennsylvania
Filed Apr. 26, 1960, Ser. No. 24,690
4 Claims. (Cl. 105—397)

This invention relates to sidewall-to-floor connection for vehicles, especially enclosed railway vehicles, and has for an object the provision of improvements in this art.

One of the particular objects of the invention is to provide a sidewall-to-floor connection which is strong and dependable.

Another object is to provide a connection which is easy to assemble.

Another object is to provide a connection which includes a thin but strong section between the sidewall and floor which will provide plate flexing movement and avoid the heavy stresses in a section-locked joint.

Another object is to provide a construction having straight side frame posts while providing maximum inside width for a given clearance at station loading platforms.

Figure 1:
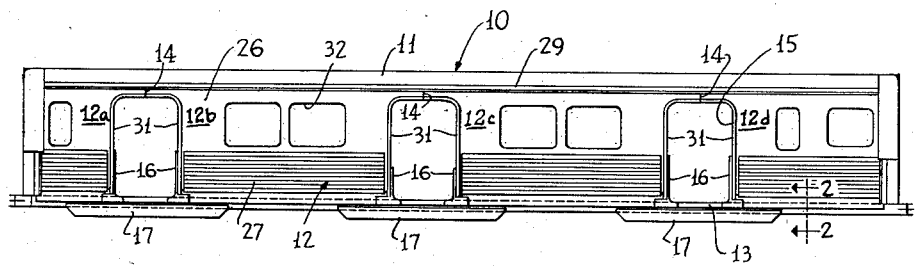
Figure 2:
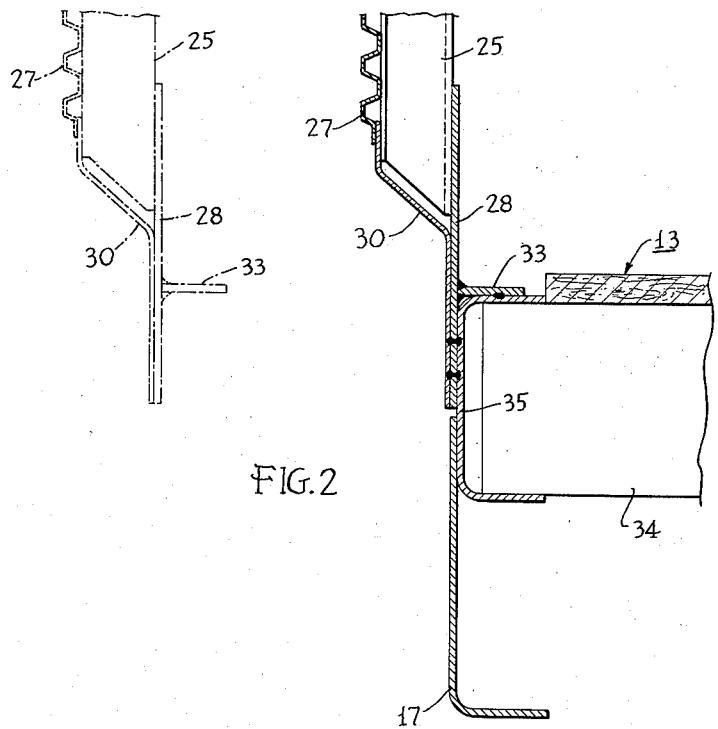

The above and other objects and various features of novelty will be apparent from the following description of an exemplary embodiment, reference being made to the accompanying drawings wherein:

FIG. 1 is a side elevation of an enclosed railway car embodying the invention; and FIG. 2 is a partial enlarged section taken on the line 2—2 of FIG. 1, the view in broken lines also showing the sidewall in a pre-assembly position.

A vehicle 10, here an enclosed railway car adapted for subway passenger use, has a roof 11, sidewall 12 and floor 13.

The sidewall is made in separate sub-assemblies 12a, 12b, 12c and 12d which meet after final assembly at lines 14 above the door openings 15. The side sub-assemblies as made, have spaced door reinforcement post elements 16 which are connected to the sidesills of the floor assembly 13 and a depending reinforcement girder element 17 is secured below each door opening.

The sidewall includes vertical posts 25, outer panel covering 26, corrugated panel covering 27, a heavy inner bottom plate 28, a through-running top beam 29, an outer bent plate 30 and an inner laterally projecting plate 33 secured to the inner side of plate 28. Floor beams 34 have welded to their ends the through-running sidesill 35, one on each side.

Each sidewall sub-assembly carries half a door frame 31 and the door reinforcement 16. There are window openings 32 suitably framed.

The posts 25 are tapered and end above the floor and the plate 30 is offset to follow the taper of the post ends. The plate 30 is welded to the outer sides of the posts and with the heavy plate 28 is welded to the sidesill 35. In assembly the lateral plate 33 serve as a rest on the sidesill when the sidewall assembly is brought into position and it is welded to the top of the sidesill.

This arrangement places the outward projection of the sidewall above the car floor where is will clear the loading platform at station stops. The connecting section just above the floor is quite thin in overall section but of heavy bendable material, consisting of the overlapping portions of plates 28 and 30, so will be very strong and not so rigid as to start breakage. If desired, the posts 25 may be notched on their inner sides to take the plate 28 and leave it flush with the inside surface of the posts.

It is seen that the invention provides a very dependable durable connection which is easy to assemble. Offset for clearing station platforms is provided yet the connection of the sidewall to the sidesills is a very efficient one structurally.

While one embodiment has been described for purposes of illustration it is to be understood that there may be various embodiments and modifications within the scope of the invention.

What is claimed is:

1. A flexible sidewall-to-floor connection for railway vehicles having a sidesill and a floor assembly and panel connected posts in a sidewall assembly, comprising in combination, sidewall posts in said sidewall assembly, a sidesill in said floor assembly, a flexible longitudinal inner plate connected to the inner side of said sidewalls posts, a flexible longitudinal outer plate connected to the outer side of said sidewall post, said inner plate and said outer plate provided with downward and vertical extensions extending from the bottom of said sidewalls post in mating parallel relationship, said mating plates being connected to the outside of said sidesill and extending vertical above said floor assembly and providing an intermediate flexible portion above said sidesill and below said sidewall post flexible both inwardly and outwardly, and a downward extending connecting plate extending from said intermediate flexible portion of said inner and outer plates for attachment to the outside of said sidesill to provide an anchor and support for said sidewall assembly.

2. A flexible sidewall-to-floor connection for railway vehicles having a sidesill in a floor assembly and panel connected posts in a sidewall assembly, comprising in combination, a sidesill, a plurality of longitudinally spaced vertical posts having their lower ends positioned above said sidesill, an elongated inner plate located adjacent and parallel to said sidesill side, said inner plate comprising a lower portion rigidly connected to the outside of said sidesill, an upper portion rigidly connected to the insides of the lower ends of said vertical posts, and an intermediate flat flexible portion which extends above said sidesill and below said vertical posts, and an outer plate comprising an upper portion connected to the outsides of the lower ends of said posts, a lower portion rigidly connected to the outside of said lower portion of said inner plate, and a flat flexible intermediate portion lying parallel and adjacent to said intermediate flat flexible portion of said inner plate, said intermediate portions of said inner and said outer plates extending verticaly above said floor assembly and being laterally flexible to permit limited lateral movement of said sidewall assembly both inwardly and outwardly relative to the normal position of said sidewall assembly.

3. A flexible sidewall-to-floor connection for railway vehicles having a floor assembly and a roof assembly interconnected by sidewall panels, comprising in combination, sidewall post in said sidewall panel, a sidesill in said floor assembly, a flat flexible inner plate connected in a vertical position to the outer side of said sidesill and to the inner side of said sidewall post to provide an intermediate flexible connection portion between the bottom of said sidewall post and the top of said sidesill, said sidewall post being located above and outside of said sidesill and said floor assembly, and an offset outward and upwardly extending flexible bent plate having an upper portion connected to the outer side of said sidewall post and having a lower portion overlapping and connected to the outside of said inner plate at the side of said sidesill and having an intermediate portion interconnecting said upper and said lower portions, said intermediate portion of said bent plate providing a flat flexible portion of said inner plate, said flexible portions of said inner and said outer plates arranged as vertical extensions of the outside of said sidesill extending vertically above said floor assembly to permit lateral movement of said sidewall assembly by inward and outward bending of said flexible portions of said inner and said outer plates.

4. A flexible sidewall-to-floor connection for railway vehicles having a floor assembly and roof assembly interconnected by sidewall panels, comprising in combination, sidewall posts in said sidewall panel, a sidesill in said floor assembly, a flat flexible inner plate connected to the outer side of said sidesill and to the inner side of said sidewall posts, said sidewall posts being located above and outside of said sidesill and said floor assembly, an offset flexible bent plate connected to the outer side of said sidewall post and overlapping and connected to the outside of said inner plate at the side of said sidesill, said offset flexible bent plate and said flat flexible inner plate providing a mating parallel flexible connection extending vertically above said floor assembly between said sidesill and said sidewall panel which permits the lateral flexing of said sidewall panel relative to said floor assembly, and a laterally and inwardly projecting plate secured to the inner side of said inner plate and secured to the top of said sidesill to anchor said flexible connection to said sidesill.

References Cited in the file of this patent
UNITED STATES PATENTS

| | | |
|---|---|---|
| 2,000,531 | McWilliams et al. | May 7, 1935 |
| 2,804,025 | Delo | Aug. 27, 1957 |
| 2,815,722 | Dean | Dec. 10, 1957 |